Jan. 15, 1952  C. M. DOYLE  2,582,901
LUBRICATING DEVICE
Filed July 1, 1949
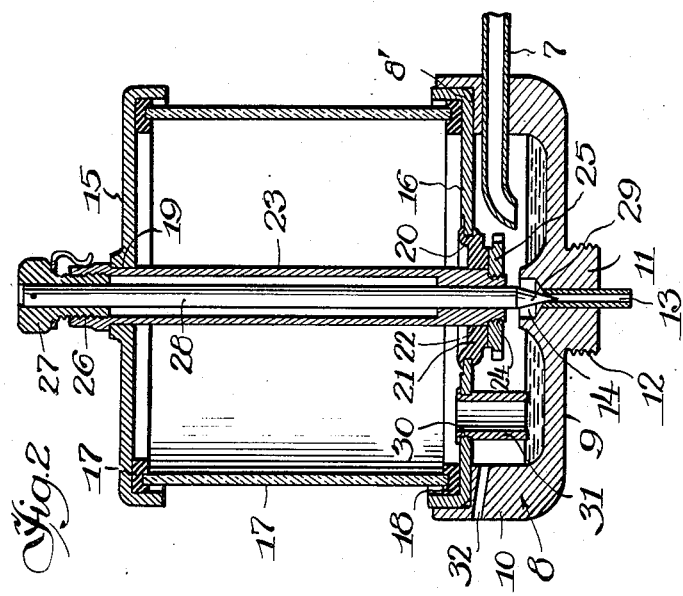
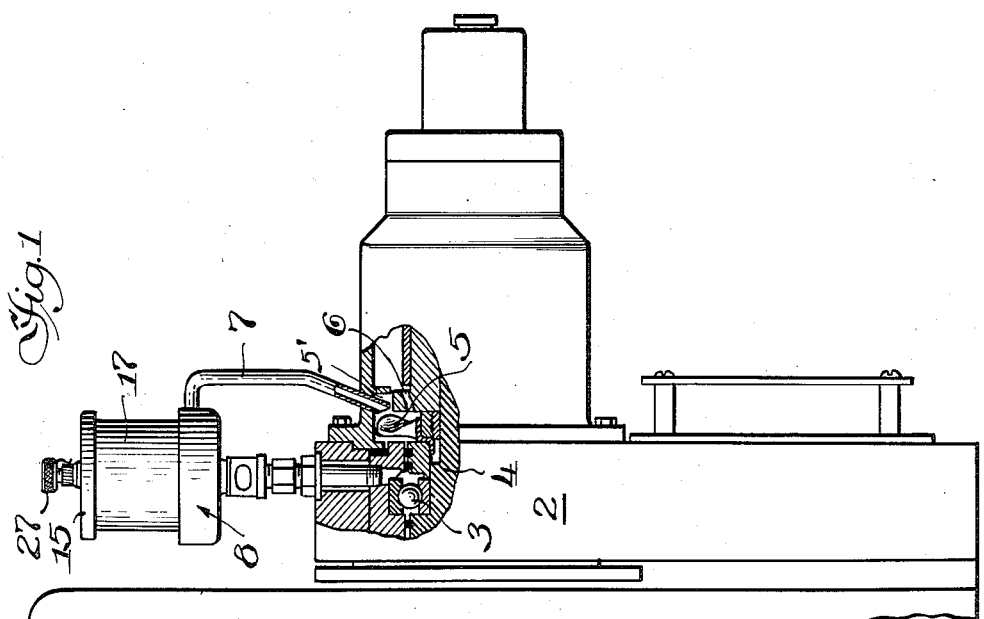
Inventor,
By Collin M. Doyle,
Schneider & Dressler
Attys.

Patented Jan. 15, 1952

2,582,901

UNITED STATES PATENT OFFICE 2,582,901

LUBRICATING DEVICE

Collin M. Doyle, Chicago, Ill., assignor to Walter J. Podbielniak and Wladzia Podbielniak Application July 1, 1949, Serial No. 102,604

9 Claims. (Cl. 184—55)

1

This invention relates to lubricating devices, and particularly to such devices capable of automatically lubricating a machine part whenever the machine is in operation.

Lack of proper lubrication in various kinds of machinery has often proved extremely expensive because of break-downs necessitating extensive repairs, and causing loss of production and waste of time. In most cases, adequate lubrication depends upon the efficiency of an operator, and his failure to oil a machine or to start the flow of oil to its parts when it begins operations may cause great damage. While many attempts have been made in the past to provide efficient automatic lubricating means, these for the most part have required expensive and complicated mechanism for synchronizing mechanical oil supply devices with the operation of the machine to be lubricated or have depended upon vibration of the machine. Such devices do not provide a constantly uniform feed of the lubricating oil, since vibration of the machine is not always uniform, and are ineffective and undependable if the machine to be oiled is well balanced and is free or substantially free of vibration.

The lubricator constructed in accordance with the present invention does not depend upon the vibration of the machine or upon feed synchronizing devices and will operate constantly to feed drops of oil at a uniform rate to the machine parts that require lubrication as long as the machine is in operation. The feeding of oil stops automatically when the operation of the machine is stopped and starts again as soon as the operation of the machine is resumed.

Applicant's oil cup has secured thereto a reservoir holding a reserve supply of oil, and after the oil cup has been installed on the machine the only human attention required is to see that the reservoir contains an adequate supply of oil at all times. Since the sides of the reservoir may be and preferably are transparent, the condition of the reservoir can be readily observed.

In addition to its constant, uniform flow of lubricant to the machine in operation, applicant's lubricator is characterized by a simplicity in parts that makes the device inexpensive to manufacture and assemble. The structure by which the above advantages are attained will be disclosed in the following specification, taken in conjunction with the accompanying drawings, in which:

Figure 1 is a fragmentary side elevation of a

2 machine to which a lubricator embodying the invention is attached, with portions of the machine in section; and Fig. 2 is an enlarged sectional view of the lubricator embodying the invention.

In Fig. 1 of the drawing, for purposes of illustration, a lubrication device in accordance with the present invention is shown in a suitable arrangement with parts of a machine with which the device is used, such as a centrifugal countercurrent contactor, a centrifugal pump or the like. As will appear hereinafter, there is incorporated in the machine, in connection with some rotating part, means for creating a low pressure air current which is used in the operation of the lubricating device. In the drawing, the reference numeral 2 indicates generally a machine having rotating parts for which there is provided a bearing 3 which requires lubrication when the machine is in operation. Within the bearing is mounted the rotatble shaft 4 and a series of vanes 5 is also mounted on the shaft so as to rotate therewith in a chamber 5' suitably provided within the casing of the machine surrounding the shaft. An air vent 6 permits the inflow of air which is forced by the action of the vanes 5 into the end of a pipe 7 to create a flow of air into the lower or cup portion 8 of the lubricator, suitably mounted to supply oil to the bearing 3.

The lower portion of the lubricator comprises a bottom 9 having a circumferential flange 10 forming a relatively shallow receptacle or cup for the lubricating oil which is to be supplied to bearing 3. A boss 11 disposed centrally of bottom 9 projects upwardly to form a low barrier or wall within the shallow cup or receptacle so formed. It also projects downwardly below the bottom 9 and is threaded as indicated at 12, so that it may be screwed into a pipe or hollow tube which leads to bearing 3. The boss is provided with a central aperture 13 forming a passageway for the oil from the oil cup to the hollow tube. Aperture 13 is enlarged at its top, adjacent the top of boss 11, as indicated at 14, thus forming a small chamber capable of holding a small quantity, say 10 to 20 drops of oil.

The upper portion of the lubricator, which constitutes the oil reservoir, comprises a top 15, bottom 16, and a cylindrical side wall 17. The side wall is preferably transparent, and may be made of glass or of any suitable plastic material. A gasket 17' seals the joints between top 15 and the top edge of side wall 17. A similar gasket 18 seals the joint between bottom 16 and the bottom edge of the side wall. The bottom member 16 of the reservoir is seated in a suitable annular seat or recess 8' formed in the bottom or cup portion 8 of the lubricator.

The top 15 of the reservoir is provided with a centrally disposed aperture 19 and its bottom 16 is also provided with a centrally disposed aperture 20. A plug 21 is secured in aperture 20 in any suitable manner. The plug is provided with a central aperture 22 the same size as aperture 19 to receive the lower end of a hollow tube 23, the upper end of which fits snugly in aperture 19. The extreme lower portion of hollow tube 23 projects slightly below plug 21 and is threaded, as indicated at 24. A nut 25 is screwed on the end of tube 23 and tightened against the bottom of plug 21 to hold the tube in place. The tube 23 is closely fitted in the openings receiving it to prevent air leakage into the oil reservoir.

The upper end of tube 23, which projects above top wall 15, is threaded internally, as indicated at 26. A cap 27 screwed into the upper end of tube 23 carries a needle valve 28 which extends through tube 23 and projects past its lower end into aperture 13 in lower portion 8. The bottom end of valve 28 is cone shaped, as indicated at 29, to regulate the dripping of oil from the enlarged portion of aperture 13 through the aperture and to the bearing which is to be lubricated. The threaded engagement between cap 27 and the upper end of tube 23 permits extremely fine adjustment of the position of the lower end of the needle valve.

Bottom wall 16 of the oil reservoir is provided with another aperture 30 into which the upper end of a tube 31 is rigidly secured. In its operating position as shown in Fig. 2, the tube 31 extends to a point below the top of boss 11 and establishes the level of oil maintained in the lower cup portion of the lubricator, as will be more fully pointed out hereinafter. Tube 31 constitutes the means for filling the upper portion or reservoir of the lubricator with oil and also constitutes the means for supplying oil from the reservoir to the lower or cup portion of the lubricator when the oil level in the lower portion recedes below the bottom of tube 31. To fill the reservoir the entire upper portion of the lubricator is removed and inverted, and the oil is then poured in through tube 31. The upper portion is then inverted again, and placed in its seat 8'.

An air vent 32 extending through flange 10 keeps the lower portion of the oil cup at atmospheric pressure. When the upper portion of the oil cup is positioned in the lower portion, as shown in Figure 2, oil will flow from the reservoir through tube 31 into the lower portion of the oil cup until the oil in the lower portion reaches the bottom of tube 31. At this point the oil in lower portion 8 forms a seal at the end of tube 31 and oil will not flow from the reservoir because of the difference in pressure in the space above the oil in the reservoir, which is a partial vacuum, and the atmospheric pressure above the surface of the oil in the lower portion of the oil cup. The pipe 7 or an extension thereof passes through the flange 10 forming the sides of the lower or cup member of the lubricator and terminates slightly above the normal level of oil therein, being bent downwardly to direct a current of air against the oil.

Whenever shaft 4 is rotated, vanes 5 create a constant stream of air which is directed through pipe 7 against the surface of the oil in the lower or cup portion of the lubricator. The stream of air from pipe 7 causes the oil to splash over into the enlarged portion 14 of aperture 13, in which a small amount of oil is retained, to be fed to the part to be lubricated. The position of needle valve 28 regulates the rate at which the oil drips from enlarged portion 14 through aperture 13 on the shaft to be lubricated. As the oil is splashed into the enlarged portion of aperture 13 the oil level in the lower portion of the oil cup recedes until it falls below the bottom edge of tube 31, thereby breaking the seal and permitting the flow of oil from the reservoir until the oil level in lower portion 8 again rises high enough to seal the bottom of tube 31. It will be obvious, from the above description, that the oil will be maintained in the lower portion of the oil cup at a substantially constant level as long as any oil remains in the upper portion of the oil cup. The transparent side walls of the upper portion of the oil cup makes it easy to see when the reservoir needs re-filling.

Since the transfer of oil from the lower portion of the oil cup to aperture 13 leading to the part to be lubricated is dependent upon the stream of air blown through pipe 7 by vanes 5 the passage of oil through aperture 13 will stop when shaft 4 carrying vanes 5 stops rotating, and will start automatically as soon as the shaft starts rotating. It will be readily apparent that the vanes or other means for producing the air current may be provided on any rotating part associated with the machine or mechanism to be lubricated, and operable with the part to be lubricated.

Although I have described a preferred embodiment of the invention in considerable detail, it will be understood that the description thereof is intended to be illustrative, rather than restrictive, as many details may be modified or changed without departing from the spirit or scope of the invention. Accordingly, I do not desire to be restricted to the exact details described.

I claim:

1. A lubricator comprising an oil cup in which oil is maintained at a substantially constant level, a passageway extending through the bottom of said cup for the supply of oil to a part to be lubricated, the top of said passageway being positioned above said oil level, a plurality of vanes mounted to rotate with the operation of the part to be lubricated to create an air stream directed against the oil in said cup to blow some of said oil from said cup into said passageway.

2. A lubricator comprising an oil cup in which oil is maintained at a substantially constant level, a passageway extending through the bottom of said cup for the supply of oil to a part to be lubricated, the top of said passageway being positioned above said oil level, a plurality of vanes mounted to rotate with the operation of the part to be lubricated to create an air stream directed against the oil in said cup to blow some of said oil from said cup into said passageway, and a needle valve in said passageway to prevent excessive flow of oil to said part.

3. A lubricator comprising an oil cup in which oil is maintained at a substantially constant level, a boss extending upwardly from the bottom of said cup to a height greater than the depth of said oil, an aperture extending through said boss and the bottom of said cup for the supply of oil to a part to be lubricated, and means for blowing oil from said cup into said aperture, said means comprising a plurality of vanes mounted to rotate with the operation of the part to be lubricated and a tube leading from a point near said vanes to a point directly above the oil, whereby a stream of air created by said vanes during the operation of the part to be lubricated is directed against said oil.

4. In a lubricator, a lower cup portion having an upwardly extending circumferential flange and a reservoir removably seated on said flange, means for automatically feeding oil from said reservoir to said cup portion to maintain a predetermined level of oil in said lower portion, a central aperture in said lower portion leading to the member to be lubricated, a needle valve extending vertically through said reservoir, the lower end of said valve being positioned in said central aperture, the position of said needle valve being adjustable from a point above said reservoir, and means operable with the member to be lubricated for blowing oil from said lower portion into said central aperture.

5. A lubricator comprising a lower cup portion, a reservoir seated above said cup portion and means for automatically feeding oil from said reservoir to said cup portion to maintain a predetermined level of oil in said cup portion, a boss extending upwardly from the bottom of said cup portion to a height above the level of oil therein, an aperture extending through said boss and the bottom of said cup portion for feeding it to the part to be lubricated, said aperture being enlarged at its top to form an oil-retaining chamber, a needle valve extending vertically through said reservoir, the lower end of said valve entering said chamber and being positioned in said aperture, the position of said needle valve being adjustable to control the flow of oil through said aperture, and a tube entering said cup portion and terminating above the level of oil therein whereby a current of air may be directed against the oil in said cup portion to blow oil into said chamber.

6. A lubricator comprising a cup portion in which oil is maintained at a substantially constant level, a boss extending upwardly from the bottom of said cup portion to a height above the level of oil therein, an aperture extending through said boss and the bottom of said cup portion for feeding oil to the part to be lubricated, said aperture being enlarged at its top to form an oil-retaining chamber, a tube entering said cup portion and terminating above the level of oil therein whereby a current of air may be directed against the oil in said cup portion to blow oil into said chamber, and valve means for controlling the flow of oil through said aperture.

7. A lubricator comprising a lower cup portion, a reservoir seated above said cup portion, a tube extending from said reservoir to a point above the bottom of said cup portion for supply of oil thereto, said reservoir being otherwise sealed against admission of air, whereby an oil level is maintained in said cup portion at about the point at which said oil supply tube terminates, a boss extending upwardly from the bottom of said cup portion to a height above the level of oil therein, an aperture extending through said boss and the bottom of said cup portion for feeding oil to the part to be lubricated, said aperture being enlarged at its top to form an oil-retaining chamber, a needle valve extending vertically through said reservoir, the lower end of said valve entering said chamber and being positioned in said aperture, the position of said needle valve being adjustable to control the flow of oil through said aperture, and a tube entering said cup portion and terminating above the level of oil therein whereby a current of air may be directed against the oil in said cup portion to blow oil into said chamber.

8. A lubricator comprising an oil cup positioned above a bearing for a movable part to be lubricated, means for maintaining oil at a substantially constant level in said cup, a boss extending upwardly from the bottom of said cup, the top of said boss being positioned above said oil level, a vertical opening through said boss and the bottom of said cup for feeding oil to said bearing, a plurality of vanes mounted to rotate with operation of said movable part to create a stream of air while said part is rotating, and a pipe directing said stream of air to the surface of said oil whereby some of said oil is blown into said opening from which it is fed to said bearing.

9. A lubricator assembly for lubricating a bearing on a rotating shaft, said lubricator comprising an upper portion constituting a reservoir and a lower portion into which oil is fed from said reservoir to a predetermined level, a passageway leading from said lower portion to said bearing, the top of said passageway being positioned above the oil level in said lower portion, a hollow pipe leading from the proximity of the shaft to a point just above the oil in said lower portion, a plurality of vanes mounted on said shaft, and an air vent leading from the atmosphere to the orbit of travel of said vanes, whereby rotation of said shaft causes a flow of air through said hollow pipe which blows oil from said lower portion into said passageway from which said oil drips on said bearing.

COLLIN M. DOYLE.

REFERENCES CITED

The following references are of record in the file of this patent:

UNITED STATES PATENTS

| Number | Name | Date |
| --- | --- | --- |
| 1,424,974 | Barnett | Aug. 8, 1922 |
| 1,901,691 | Aull | Mar. 14, 1933 |
| 1,960,070 | Sellers | May 22, 1934 |
| 2,042,575 | Worth | June 2, 1936 |
| 2,242,262 | Ray | May 20, 1941 |

FOREIGN PATENTS

| Number | Country | Date |
| --- | --- | --- |
| 373,536 | Germany | Apr. 13, 1923 |